(12) United States Patent
Devarajan (10) Patent No.: US 10,356,037 B2
(45) Date of Patent: Jul. 16, 2019

(54) ADDRESS RESOLUTION REWRITING

(71) Applicants: HEWLETT-PACKARD DEVELOPMENT COMPANY, L.P., Houston, TX (US); Venkatavaradhan Devarajan, Bangalore (IN)

(72) Inventor: Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 79 days.

(21) Appl. No.: 14/900,162

(22) PCT Filed: Aug. 1, 2013

(86) PCT No.: PCT/IN2013/000477
§ 371 (c)(1),
(2) Date: Dec. 20, 2015

(87) PCT Pub. No.: WO2015/015505
PCT Pub. Date: Feb. 5, 2015

(65) Prior Publication Data
US 2016/0142365 A1    May 19, 2016

(51) Int. Cl.
*H04L 29/12* (2006.01)
*H04L 12/64* (2006.01)
(Continued)

(52) U.S. Cl.
CPC .......... *H04L 61/10* (2013.01); *H04L 12/6418* (2013.01); *H04L 45/38* (2013.01);
(Continued)

(58) Field of Classification Search
CPC ...................................................... H04L 61/10
See application file for complete search history.

(56) References Cited

U.S. PATENT DOCUMENTS

| 6,618,398 B1 * | 9/2003 | Marchetti | H04B 7/18582 370/401 |
| 2008/0031249 A1 * | 2/2008 | Valtchev | H04L 12/66 370/392 |

(Continued)

FOREIGN PATENT DOCUMENTS

| CN | 102355417 A | 2/2012 |
| CN | 103023818 A | 4/2013 |

(Continued)

OTHER PUBLICATIONS

International Search Report and Written Opinion, International Application No. PCT/IN2013/000477, dated May 8, 2014, pp. 1-11.

(Continued)

*Primary Examiner* — Derrick W Ferris
*Assistant Examiner* — Kevin H Lee
(74) *Attorney, Agent, or Firm* — Mannava & Kang, P.C.

(57) ABSTRACT

A network controller may rewrite an address resolution request and an address resolution response. The address resolution request may be rewritten by changing a request source link address to a link address of a first switch. The address resolution response may be rewritten by changing a response source link address to a link address of a second switch.

17 Claims, 5 Drawing Sheets

(51) Int. Cl.
*H04L 12/721* (2013.01)
*H04L 12/715* (2013.01)
*H04L 12/741* (2013.01)

(52) U.S. Cl.
CPC ............. *H04L 45/64* (2013.01); *H04L 45/72* (2013.01); *H04L 45/74* (2013.01)

(56) References Cited

U.S. PATENT DOCUMENTS

| | | |
|---|---|---|
| 2012/0155467 A1 | 6/2012 | Appenzeller |
| 2012/0263183 A1 | 10/2012 | Weill et al. |
| 2013/0058251 A1 | 3/2013 | Koponen et al. |
| 2013/0182604 A1* | 7/2013 | Moreno ............... H04L 61/103 370/254 |
| 2013/0279371 A1* | 10/2013 | Takashima ............ H04L 45/38 370/254 |
| 2014/0126576 A1* | 5/2014 | Kumagai ............... H04W 40/02 370/392 |
| 2014/0286328 A1* | 9/2014 | Elgarisi ............... H04L 12/4625 370/338 |

FOREIGN PATENT DOCUMENTS

| | | |
|---|---|---|
| JP | 2008-109357 A | 5/2008 |
| WO | WO-2012/170016 A1 | 12/2012 |
| WO | 20131008114 A1 | 1/2013 |
| WO | 20131106513 A1 | 7/2013 |

OTHER PUBLICATIONS

Martin Casado et al., "Ripcord: A Modular Platform for Data Center Networking," Technical Report No. UCB/EECS-2010-93, Jun. 7, 2010, pp. 1-15.

Open Networking Foundation, "OpenFlow Switch Specification", Version 1.1.0, Implemented (Wire Protocol 0x02), ONF TS-002, Feb. 28, 2011, pp. 1-56.

Open Networking Foundation, "OpenFlow Switch Specification", Version 1.0.0, Wire Protocol 0x01, ONF TS-001, Dec. 31, 2009, pp. 1-42.

McKeown et al., "OpenFlow: Enabling Innovation in Campus Networks", ACM SIGCOMM Computer Communication Review, vol. 38, No. 2, Apr. 2008, pp. 69-74.

International Preliminary Report on Patentability received for PCT Application No. PCT/IN2013/000477, dated Feb. 11, 2016, 6 pages.

* cited by examiner

ADDRESS RESOLUTION REWRITING

BACKGROUND

In networks using software defined networking (SDN), one or more network controllers may manage the control plane of network switches, such as bridges and routers. The network controller may also manage the data plane of the switches by providing flow handling rules to the switches.

In some SDN networks, such as networks implementing an OPENFLOW standard (an "OPENFLOW network"), when a packet is received by a controlled switch, the switch determines if it has a rule applicable to the packet. Such a rule may be defined to apply if a matching criterion is satisfied. For example, the matching criterion may be based on source or destination IP or MAC address, port numbers, transport protocol type, frame type, class of service indicators, or frame control information. If the matching criterion is met, the rule may define various actions for the switch to take. For example, the rule may direct the switch to forward the packet out of a particular port. If the switch does not have a rule applicable to the packet, the switch may transmit all or a portion of the packet to a network controller to allow the network controller to provide a rule applicable to the packet.

BRIEF DESCRIPTION OF THE DRAWINGS

Certain examples are described in the following detailed description and in reference to the drawings, in which.

DETAILED DESCRIPTION OF SPECIFIC EXAMPLES

In an SDN network, a network controller may define flow rules to implement network paths on a per endpoint basis. For example, to implement a flow on a single subnet of a virtual local area network (VLAN) between a first host, H1, and a second host, H2, a network controller may provide each switch in the flow path with a rule of the type illustrated in Table 1:

TABLE 1

| Match Condition | Action |
| --- | --- |
| Destination Address == MAC_H2<br>Other Fields == wildcards | Output port = {i} |

In Table 1, MAC_H2 refers to the Media Access Control (MAC) address of the second host, H2, and i is specific to each switch to implement the path. Accordingly, the rule causes a switch to output a packet to output port i if a packet is received with H2's MAC address as the destination address, where the value of i depends on the switch.

Programming flow rules on a per endpoint basis may consume significant forwarding table resources and render it difficult to scale up the number of active endpoints in a network. Additionally, the workload of programming flows may be directly proportional to the number of switches and endpoints in a network. Workload scalability may become a concern as network sizes increase. For example, to cope with the number of endpoint-to-endpoint flows, a network administrator may need to utilize more expensive and power intensive switches having larger ternary content addressable memory (TCAM) tables.

Additionally, a network controller may add and remove flow rules on a per flow basis. This may require significant overhead, particularly if there are many transient or ephemeral flows. For example, a network controller may send out a set of flow rules for each new Transport Control Protocol (TCP) connection, and may remove the flow rules when the TCP connection ends.

Some implementations of the disclosed technology rewrite packets such that packets between endpoint hosts are rewritten to appear to be addressed to and from the edge switches connected to the hosts. Accordingly, the edge switches may act as proxies for their connected endpoint host devices. This may simplify the number of different paths through a network because the number of switches in the network may be less than the number of endpoints in the network. In turn, this may reduce the forwarding table resources needed to implement the network.

Figure 1:
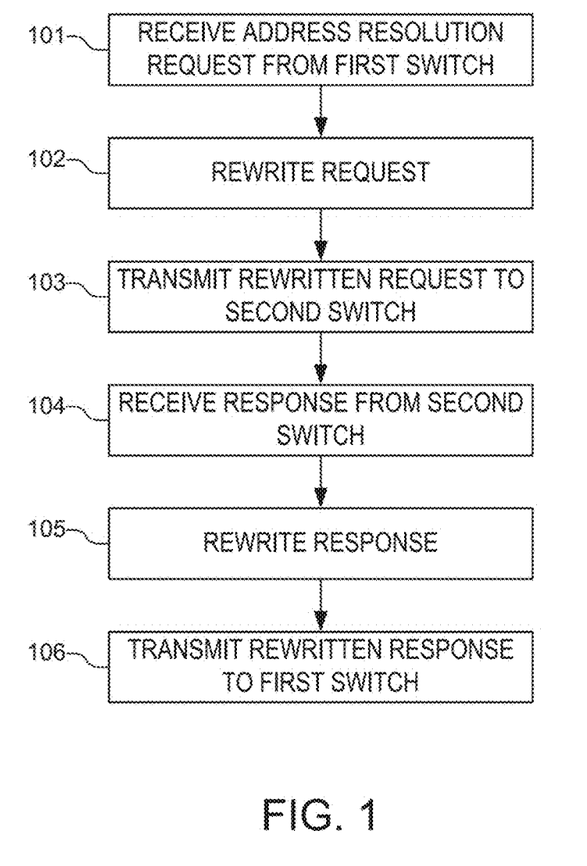
FIG. 1 illustrates an example process of network control including rewriting address resolution packets.

FIG. 1 illustrates an example process of network control including rewriting address resolution packets. For example, the illustrated process may be performed by a network controller in an SDN network, such as an OPENFLOW network. The network controller may be connected to a number of switches, such as bridges and routers, through a control interface. For example, the control interface may be an out-of-band network coupling the switches to the network controller. In various implementations, the network controller and connected network devices may be physical or virtual network devices. By performing the example process, the network controller may cause edge switches to act as proxies for connected devices, reducing the number of flow rules needed to provide paths between devices.

In some examples, edge switches may be at the edge of the SDN network controlled by the network controller. In these examples, the edge switch may be directly connected to the host or may be connected to the host via one or more devices that are not controlled by the network controller.

The example process includes a step 101 of receiving an address resolution request from a first switch. For example, step 101 may be performed by the network controller. The address resolution request may be forwarded by the first switch from a source host. For example, the first switch may receive and forward the address resolution request from a directly or indirectly connected source host. For example, the address resolution request may be an Address Resolution Protocol (ARP) request or a Neighbor Discovery Protocol (NDP) solicitation.

In some implementations, a network controller may provide address resolution request forwarding rules to its controlled switches. The address resolution request forwarding rules may cause the switches to forward packets to the network controller if the packets have a packet type matching the address resolution request packet type. For example, the forwarding action may occur if the packet has an ARP EtherType or NDP Internet Control Message Protocol version 6 (ICMPv6) type.

The example process includes a step 102 of rewriting the address resolution request by changing a request source link address to a first switch link address. For example, the request source link address may be a MAC address of a source host that generated an ARP request. The first switch link address may be a MAC address of an edge switch that is connected to the source host. After rewriting the request source link address, the source host's internetwork address may be associated with the first switch's link address. For example, the first switch's MAC address may be associated with the source host's IP address in address tables maintained by other network devices.

In some cases, the request source link address may be included at multiple locations in the request. For example, the request source link address may occur in an Ethernet frame header and in an ARP packet transported in the Ethernet frame. Step 102 may include changing the request source link address at any location it occurs. For example, the network controller may rewrite the request as indicated in Table 2.

The example process also includes a step 104 of receiving an address resolution response from the second switch. For example, step 104 may be performed by the network controller. In some cases, the address resolution response may be forwarded to the controller by the second switch from a target host specified in the address resolution request. In other cases, the address resolution response may be sent to the controller by a router or gateway. For example, the address resolution response may be an ARP response to an ARP request or an NDP advertisement in response to an NDP solicitation.

In some implementations, the network controller may provide address resolution response forwarding rules to its controlled switches. The address request resolution response forwarding rules may cause the switches to forward packets to the network controller if the packets have a packet type matching the address resolution request packet type. The response received in step 104 may be an address resolution response forwarded by the second switch according to such a rule. In some implementations, the address request resolution response forwarding rules may be the same as the address request resolution request forwarding rules. For example, a single rule may be provided for both request and response forwarding if the rule specifies forwarding all packets having an ARP EtherType or NDP ICMPv6.

TABLE 2

|  | Ethernet Frame Header Fields | | | ARP Packet Fields | | | | |
| --- | --- | --- | --- | --- | --- | --- | --- | --- |
|  | DA | SA | Type | Header | Sender MAC | Sender IP | Target MAC | Target IP |
| Received Request | FFFF . . . | MAC_H1 | 0x0806 | ARP Request Header | MAC_H1 | IP_H1 | 000 . . . | IP_H2 |
| Rewritten Request | FFFF . . . | MAC_S1 | 0x0806 | ARP Request Header | MAC_S1 | IP_H1 | 000 . . . | IP_H2 |

In Table 2, DA denotes a destination MAC address, which is a placeholder value in an ARP request frame; SA denotes a source MAC address; MAC_H1 denotes the source host's MAC address; MAC_S1 denotes MAC address of the edge switch connected to the source host; 0x0806 is the ARP EtherType code; IP_H1 denotes the source host's Internet Protocol (IP) address; IP_H2 denotes the destination host's IP address; and the target MAC address in the ARP packet is another placeholder value.

The example process includes a step 103 of transmitting the rewritten address resolution request to a second switch. For example, the second switch may be an edge switch connected to a destination host specified in the address resolution request. In some implementations, step 103 includes broadcasting the rewritten address resolution request to the controlled switches of the network. For example, the controller may send a separate outgoing message to each of the controlled switches in a subnet of the network using an out-of-band SDN control network. As another example, the controller may broadcast rewritten messages in-band in frames addressed to the switches. As a further example, the second switch may be a router or gateway connected to another subnet.

The example process further includes a step 105 of rewriting the address resolution response by changing a response source link address to a second switch link address. For example, the response source link address may be a MAC address of a destination host that generated the ARP response. The second switch link address may be the MAC address of an edge switch that is connected to the destination host. After rewriting the response source link address, the destination host's internetwork address may be associated with the second switch's link address. For example, the second switch's MAC address may be associated with the destination host's IP address in address tables, such as ARP caches, maintained by network devices.

In some cases, the response source link address may be included at multiple locations in the request. For example, the response source link address may occur in an Ethernet frame header and in an ARP packet transported in the Ethernet frame. Step 104 may include changing the response source link address at any location it occurs. For example, if the response is to the rewritten request described in relation to Table 2, the network controller may rewrite the response as indicated in Table 3.

TABLE 3

| | Ethernet Frame Header Fields | | | | ARP Packet Fields | | | |
| --- | --- | --- | --- | --- | --- | --- | --- | --- |
| | | | | | Sender | Sender | Target | Target |
| | DA | SA | Type | Header | MAC | IP | MAC | IP |
| Received Response | MAC_S1 | MAC_H2 | 0x0806 | ARP Response Header | MAC_H2 | IP_H2 | MAC_S1 | IP_H1 |
| Rewritten Response | MAC_S1 | MAC_S2 | 0x0806 | ARP Response Header | MAC_S2 | IP_H2 | MAC_S1 | IP_H1 |

In Table 3, MAC_H2 denotes the destination host's MAC address; MAC_S2 denotes the second switch's MAC address; and the remaining entries have the same meaning as in Table 2.

In further implementations, step 105 may further include changing a response destination link address to the source host link address. In some implementations, the network controller may obtain the host link address from the address resolution request received in step 101. Changing the response destination link address may prevent the source host from dropping the address resolution response. For example, if the received response is a response to the rewritten request described in relation to Table 2, the network controller may rewrite the response as indicated in Table 4.

TABLE 4

| | Ethernet Frame Header Fields | | | | ARP Packet Fields | | | |
| --- | --- | --- | --- | --- | --- | --- | --- | --- |
| | | | | | Sender | Sender | Target | Target |
| | DA | SA | Type | Header | MAC | IP | MAC | IP |
| Received Response | MAC_S1 | MAC_H2 | 0x0806 | ARP Response Header | MAC_H2 | IP_H2 | MAC_S1 | IP_H1 |
| Rewritten Response | MAC_H1 | MAC_S2 | 0x0806 | ARP Response Header | MAC_S2 | IP_H2 | MAC_H1 | IP_H1 |

In Table 4, entries have the same meaning as in Tables 2 and 3. In other implementations, the network controller may provide a rule to the first switch to rewrite the destination link of the response packet to the source host's link address.

The example process further includes a step 106 of transmitting the rewritten address resolution response to the first switch. For example, step 106 may include transmitting the rewritten address resolution response out-of-band using an SDN control network. As another example, step 106 may include transmitting the rewritten response in-band encapsulated in a frame addressed to the first switch. The first switch may then transmit the rewritten response to the source host. Accordingly, the source host may update its address table to associate the destination host's internetworking address with the second switch's link address. For example, the source host may update its ARP cache to associate the destination host's IP address with the second switch's MAC address.

Figure 2:
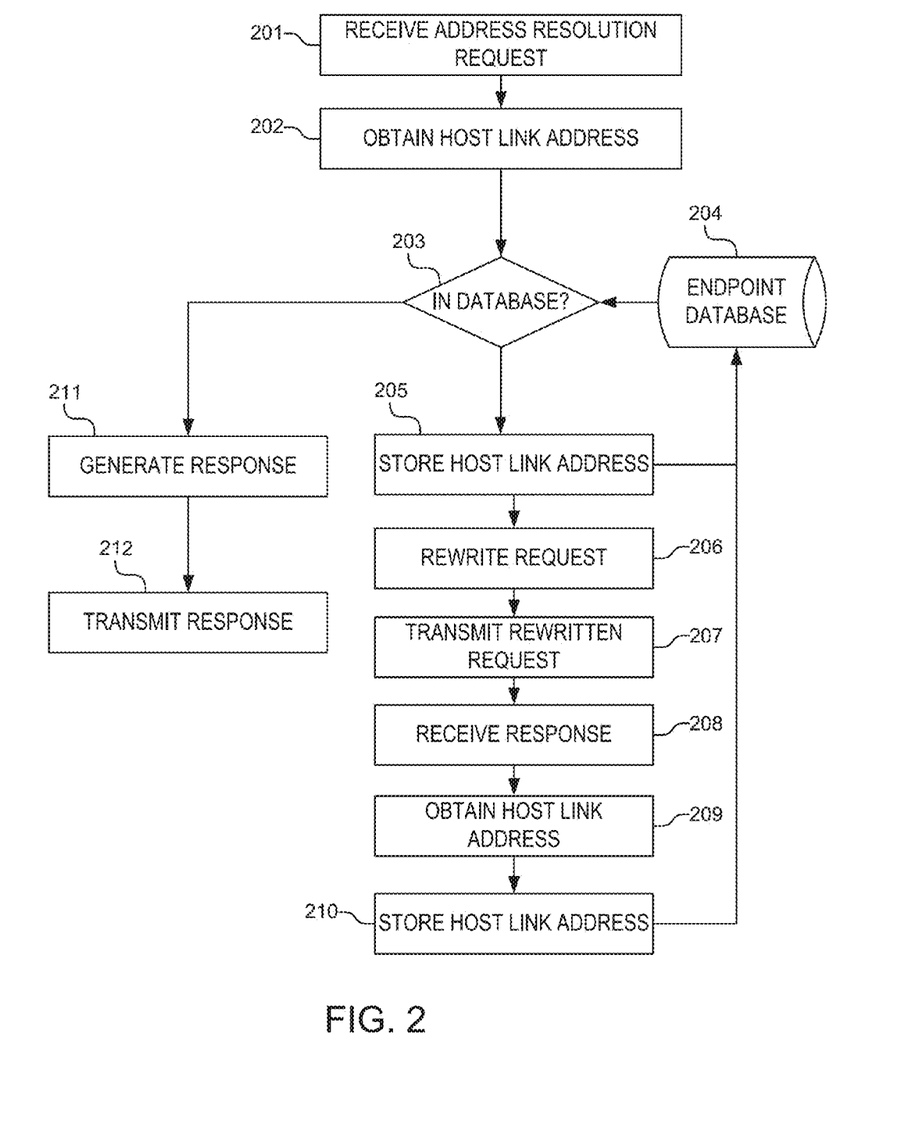
FIG. 2 illustrates an example process of network control including managing an endpoint database.

FIG. 2 illustrates an example process of network control including managing an endpoint database. For example, the illustrated process may be performed by a network controller managing an SDN network, such as an OPENFLOW network.

The example process includes a step 201 of receiving an address resolution request. For example, like the example process illustrated in FIG. 1, the address resolution request may be received by a network controller after being forwarded by a first switch. In some implementations, the request may be received out-of-band via a control interface.

The example process further includes a step 202 of obtaining a host link address from the address resolution request. For example, a network controller may obtain a source host's MAC address from an ARP request or an NDP solicitation obtained in step 201.

In the illustrated example, the network controller may maintain an endpoint database 204. The endpoint database 204 may have entries associating host devices' link and internet addresses with their connected edge switches' identifications. Entries in the endpoint database 204 may also include a port or interface number connecting the edge switch and its associated host device. For example, Table 5 shows an example entry of an example endpoint database 204.

TABLE 5

| IP Address | MAC address | Edge Switch ID | Edge Switch Interface |
| --- | --- | --- | --- |
| IP_H1 | MAC_H1 | S1 | K |

In Table 5, S1 is a device identification number used by the controller to identify the first switch, such as a link address of the first switch; K is the interface to which the source host is connected, such as a port number; and the remaining entries have the same meaning as in Tables 2-4.

The process includes a step 203 of determining if the host link address obtained in step 202 is in the endpoint database 204. If not, then a step 205 of storing the first host link address may be performed. In step 205, the stored first host link address may be associated with a first host internetwork address and the first switch link address in the endpoint database 204.

The illustrated process further includes a step 206 of rewriting the address resolution request. Step 206 may include rewriting the address resolution request by change the request source link address to the first switch's link address. If the request source link address corresponds to a host link address in the database 204, then step 206 may be performed after step 203 using information obtained from the database 204. For example, during a subsequent operation, the controller may perform step 201 by receiving a second address resolution request. The second address resolution request may have a request destination internetwork address that is a stored internetwork address stored in the endpoint database 204. In this example, the controller may perform step 206 after step 203.

The process further includes a step 207 of transmitting the rewritten request and a step 208 of receiving a response to the rewritten request. For example, steps 207 and 208 may be performed in a manner similar to steps 103 and 104 of FIG. 1.

The example process includes a step 209 of obtaining a second host link address from the address resolution response. For example, the second host link address may be the requested MAC address of a target host indicated in the address resolution request.

The example process further includes a step 210 of storing the second host link address associated with a second host internetwork address and the second switch link address in the endpoint database 204. For example, Table 6 illustrates an example entry for the endpoint database 204.

TABLE 6

| IP Address | MAC address | Edge Switch ID | Edge Switch Interface |
|---|---|---|---|
| IP_H2 | MAC_H2 | S2 | L |

In Table 6, S2 is a device identification number used by the controller to identify the second switch, such as a link address of the second switch; L is the interface to which the destination host is connected, such as a port number; and the remaining entries have the same meaning as in Tables 2-4.

After step 210, the example process may proceed as described with respect to steps 105 and 106 of FIG. 1.

In some implementations, the network controller may use information in the endpoint database 204 to bypass a remainder of the address resolution process. For example, in the illustrated process, during a subsequent operation the network controller may perform step 201 by receiving a second address resolution request. During step 203, the network controller may determine that the request has a request destination internetwork address that is a stored internetwork address stored in the endpoint database 204. For example, the request may have a target IP address that corresponds to a host IP address stored in the database 204.

In these cases, the process may include a step 211 of generating an address resolution response. For example, step 208 may include generating an address resolution response having a response destination link that is switch link address associated with the stored internetwork address. As an example, in step 201, the controller may receive an ARP request from host H1 requesting the MAC address of a second destination host, H3. The network controller may determine in step 203 that H3's IP address is stored in the endpoint database 204 and associated with a third edge switch S3. If so, the network controller may perform step 211 to generate an ARP response including S3's MAC address as the destination MAC address The network controller may then perform step 212 by transmitting the generated address resolution response. In some implementations, step 212 may comprise broadcasting the generated address resolution response to the controlled switches. For example, the controller may broadcast the response to allow the network to update address tables. As another example, the network controller may perform step 212 by transmitting the generated address resolution response only to the edge switch connected to the host performing the address resolution request.

Figure 3:
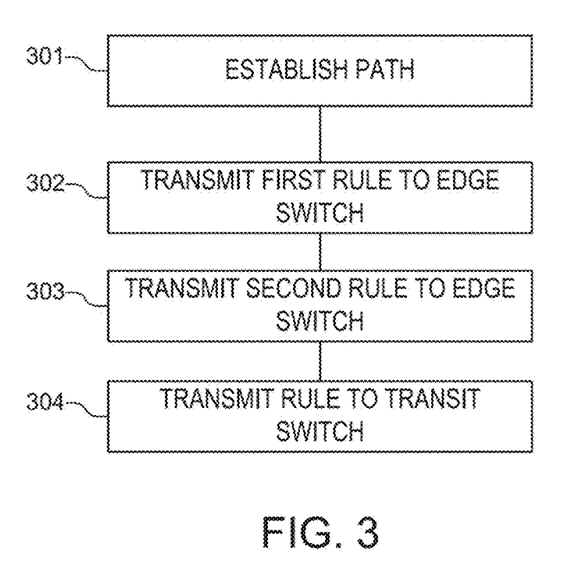
FIG. 3 illustrates an example process of network control including establishing a network path between edge switches.

In some implementations, a network controller may provide path management rules to its controlled switches. For example, rules may be formatted and transmitted in compliance with an SDN networking protocol, such as an OPENFLOW standard. FIG. 3 illustrates an example process of establishing a network path between edge switches. For example, the illustrated process may be performed to cause edge switches to translate packet addresses so that packets are delivered to the correct host devices. As a further example, the illustrated process may be performed to manage paths between edge switches through transit switches.

The example process may also include a step 303 of establishing network paths. For example, with respect to FIG. 1, the step 301 may be performed to establish a path between the first switch connected to the first host transmitting the address resolution request and the second switch connected to the second host transmitting the address resolution response. The path established in step 301 may be used for subsequent flows between the first host and the second host. The path may be implemented as forwarding rules that define how transit switches between the edge switches handle packets from the first edge switch to the second edge switch. For example, the forwarding rules may be based only on destination link addresses as match criteria. As another example, the forwarding rules may be based on a destination link and source link address pair. In the second example, multiple link level paths may be used for traffic to a single edge switch.

In further implementations, step 303 may include establishing multiple paths between a pair of edge switches. For example, multiple paths may be established to implement Quality of Service (QoS). In this example, QoS values may be included in forwarding rule criteria to indicate different paths for the packet. Additionally, edge switches may be provided with rewriting rules to establish the QoS values. For example, QoS value rewriting rules may be provided if hosts may not be trustworthy to set their own QoS values.

The example process may include a step 302 of transmitting a first rule to a first switch. For example, the first switch may be an edge switch connected to a host that transmitted an address resolution request or address resolution response that was rewritten during the process illustrated and described with respect to FIG. 1. The first rule may instruct the first switch to rewrite a first packet received from a host to have a source link address that is the link address of the switch. The first rule may specify the host's internetwork address as a match condition. For example, the rule may specify that any packet having the host's IP address as the source IP address be rewritten so that the source MAC address is replaced with the first switch's MAC address. In some implementations, this rule may ensure that the source link address of a packet matches the entry in the ARP cache of the destination host. This may prevent destination host security or firewall software from interfering with packet delivery.

In further implementations, the first rule may include further actions. For example, the first rule may instruct the first switch to output the packet on a specific output port. This may allow the network manager to select the path to be used to transmit packets from the host to other network devices. For example, the first rule may include an output instruction to implement the path established in step 301. In some implementations, the first rule may also include any QoS rewriting rules established as part of step 301.

The example process may also include a step 302 of transmitting a second rule to the first switch. The second rule may instruct the first switch to rewrite a second packet destined for the host to have a destination link address that is the host's link address. The second rule may specify the host's internetwork address as a match condition. For example, the rule may specify that any packet having the host's IP address as the destination IP address be rewritten so that the destination MAC address is replaced with the host's MAC address. The second rule may include further actions. For example, the second rule may instruct the switch to output the packet on the interface connected to the host. In some implementations, after an address resolution rewriting process, other network devices may associate the host's internetworking address with the switch's link address. Accordingly, packets destined for the host's internetworking address may be addressed to the switch's link address. After implementing the second rule, packets may be written to be correctly delivered to the host.

The example process may also include a step 304 of transmitting a forwarding rule to a third switch in the path to implement the path established in step 301. For example, the forwarding rule may define a match criterion based on source and destination link addresses and may specify an outgoing forwarding interface. In some implementations, because the source and destination link addresses are rewritten to be edge switch addresses, the number of forwarding rules needed to handle packets is reduced. This may reduce the flow rule programming overhead on the controller. This may also decouple the scalability of the number of supportable endpoints from the size of the forwarding tables on the network switches.

In some implementations, step 304 is repeated to provide a second forwarding rule to a fourth switch in a second path between the first and second switches. For example, to establish different levels of QoS, the network controller may establish multiple paths between pairs of switches. In these implementations, the rules transmitted in step 304 may further include QoS values as match criteria.

Additionally, in some implementations, the forwarding rule transmitted in step 304 may be maintained while the hosts are present on the network and connected to the same edge switches. In these implementations, clearing non-active endpoint flows does not require removing rules from transit switches. Rather, clearing non-active endpoint flows may be implemented by transmitting clearing instructions only to the corresponding edge switches. This may reduce the burden on the network controller.

Figure 4:
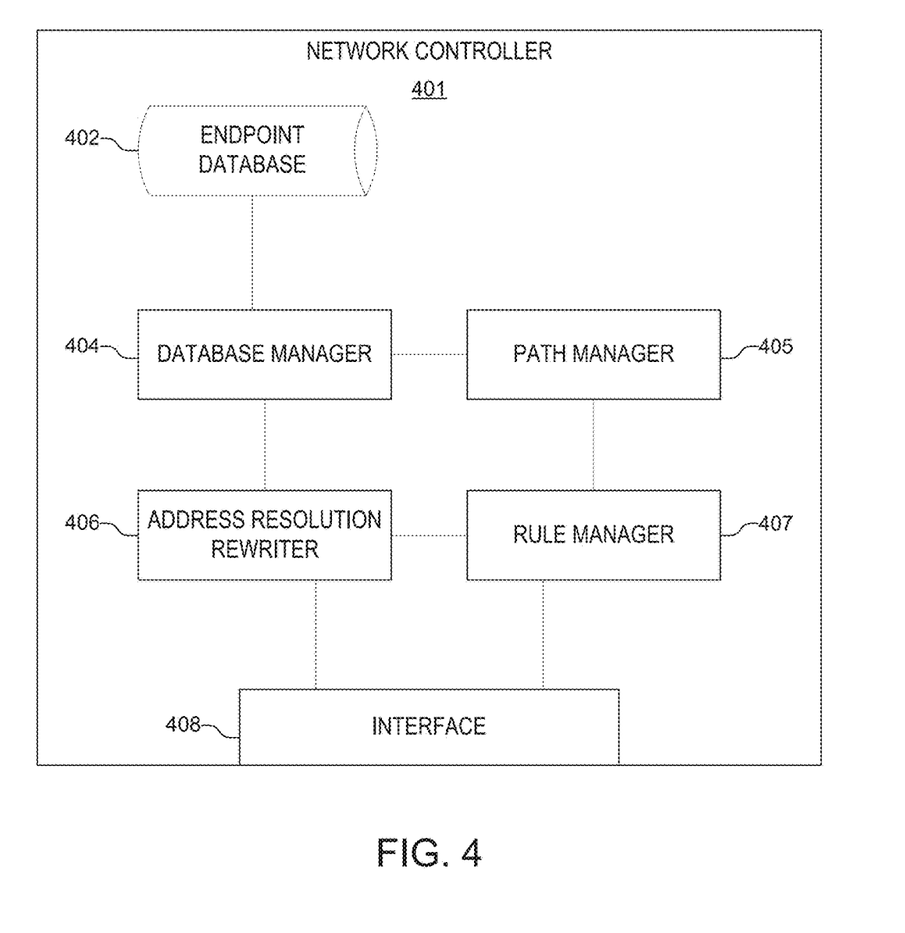
FIG. 4 illustrates an example network controller including an address resolution rewriter and rule manager.

FIG. 4 illustrates an example network controller 401 including an address resolution rewriter 406 and rule manager 407. For example, the example network controller 401 may comprise an SDN controller managing an SDN network, such as an OPENFLOW network. In some examples, the illustrated modules may be implemented as processor-executable instructions on non-transitory computer readable media, as hardware, or as a combination of the two. In some implementations, during operation, the example network controller 401 may perform the processes described and illustrated with respect to FIG. 1, 2, or 3.

The example network controller 401 may include an interface 408. For example, the interface 408 may be an out-of-band control interface to connect to controlled switches. As another example, the interface 408 may be a network interface to connect in-band with controlled switches.

In some implementations, the interface 408 may allow the controller 401 to receive an address resolution request from a first switch and to receive an address resolution response from a second switch. The interface 408 may also be used to transmit rewritten address resolution packets. For example, the interface 408 may be used to transmit a rewritten address resolution response to the second switch and a rewritten address resolution request to the first switch.

The network controller 401 may also include an address resolution rewriter 406. The address resolution rewriter 406 may rewrite the address resolution request received using the interface 408. For example, the rewriter 406 may rewrite the address resolution request by changing a request source link address to the first switch's link address.

The address resolution rewriter 406 may also rewrite the address resolution response by changing a response source address to the second switch's link address. In further implementations, the rewriter 406 may rewrite the address resolution response by changing the destination link address of the response to a host's link address. For example, the host's link address may be the link of the host that generated the address resolution request.

The example network controller 401 may also include a database manager 404. For example, the database manager 404 may manage an endpoint database 402. The database manager 404 may store host link addresses associated with host internetwork addresses and switch link addressed. For example, the database manager 404 may obtain and store a first host link address, first host internetwork address, and first switch link address from an address resolution request received through the interface 408. As another example, the database manager 404 may obtain and store a second host link address, second host internetwork address, and second switch link address from an address resolution response received through the interface 408. The database manager 404 may obtain this information directly from the interface 408, or from the address resolution rewriter 406. Additionally, the database manager 404 may provide the entries from the endpoint database 402 to the rewriter 406.

The example network controller 401 may also include a path manager 405. The path manager 405 may be used to establish paths to destination edge switches or between pairs of switches. For example, the path manager 405 may establish a path to the switch that forwarded the address resolution response. As another example, the path manager 405 may establish a path between the switch that forwarded the address resolution request received and the switch that forwarded the address resolution response.

In some implementations, the path manager 405 may establish multiple paths between pairs of switches. To implement the paths, the path manager 405 may transmit a first forwarding rule to a switch in a first path and may transmit a second forwarding rule to a switch in a second path. For example, the path manager 405 may establish multiple paths between pairs of switches to implement QoS. In this example, the path manager 405 may transmit a first set of rules to transit switches in a first QoS path and a second set of rules to transit switches in a second QoS path.

The example network controller 401 further includes a rule manager 407. In some implementations, the rule manager 407 may provide a first rule to a switch to rewrite a source link address of a received packet. For example, the rule manager 407 may provide a rule to the first switch that forwarded the address resolution request. The first rule may instruct the first switch to rewrite packets received from the host that generated the address resolution request. The first rule may cause the first switch to rewrite the packets' source link address to the switch's link address. For example, the rule manager 407 may specify the host's internetwork address as a match criterion to cause the second switch to perform the rewrite.

In further implementations, the rule manager 407 may provide a second rule to the second switch that forwarded the address resolution response. The second rule may instruct the second switch to rewrite the source link address of packets received from the host that generated the address resolution response. The second rule may cause the second switch to rewrite the packets' source link address to second switch's link address. For example, the rule manager 407 may specify the host's internetwork address as a match criterion to cause the second switch to perform the rewrite.

In further implementations, the rule manager 407 may provide a rule to a switch to rewrite the destination link address of a received packet. For example, the rule manager 407 may provide a second rule to the first switch that forwarded the address resolution request. The second rule may instruct the first switch to rewrite the destination link address to the link address of the host that transmitted the address resolution request. For example, the rule manager 407 may specify the host's internetwork address as a match criterion to cause the first switch to perform the rewrite.

In further implementations, the rule manager 407 may provide a rule to provide a second rule to the second switch to rewrite a source link address of a second packet to the second switch link address if the second packet is received from a second host.

Figure 5:
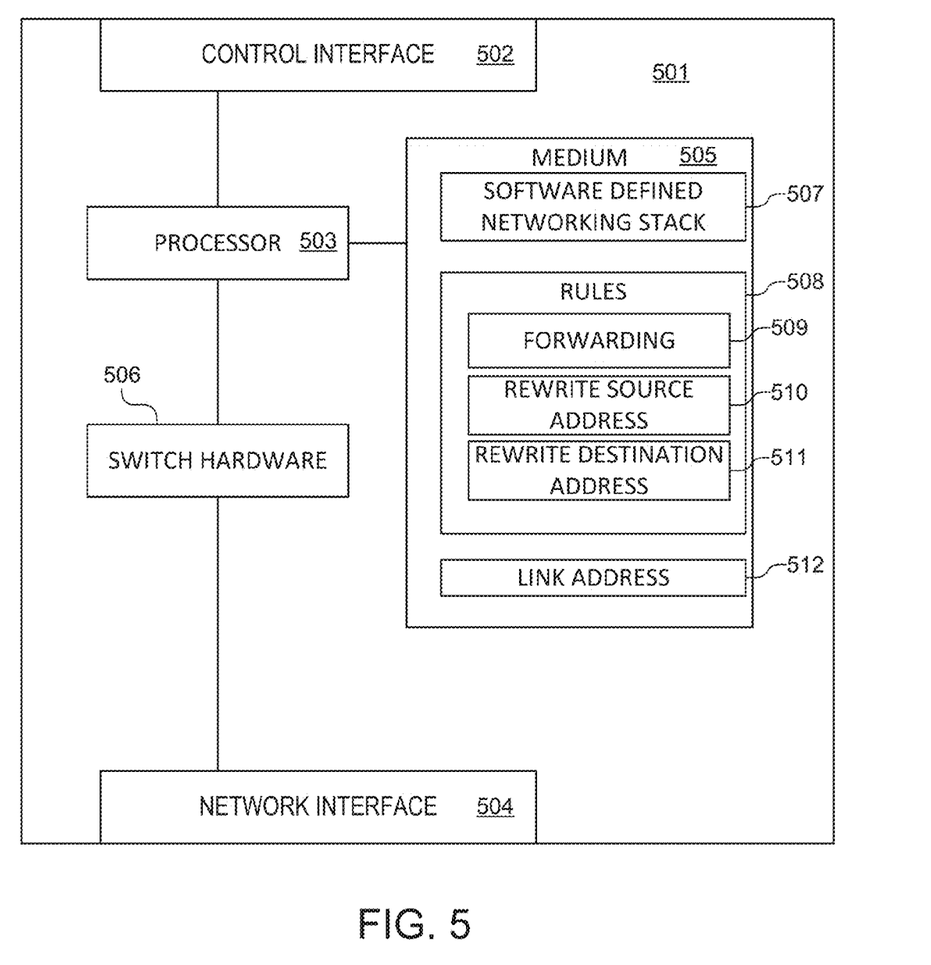
FIG. 5 illustrates an example network switch including a non-transitory computer readable medium storing instructions to cause the switch to forward address resolution packets and rewrite packets received from or destined for a host.

FIG. 5 illustrates an example network switch 501 including a non-transitory computer readable medium 506 storing instructions 508 to cause the switch 501 to rewrite packets. In some implementations, the switch 501 may be a switch an SDN network controlled by a network controller. For example, the switch 501 may be an edge switch interacting with a network controller performing a process, such as the example processes illustrated in FIGS. 1-3.

The example switch 501 may include a processor 503 coupled to a control interface 502, a non-transitory computer readable medium 505, and switch hardware 506. For example, the processor 503 may be a network processor implementing an SDN protocol stack 507 to configure switch hardware 506, such as TCAM tables, according to rules 508 provided by a controller over the control interface 502. In some implementations, the non-transitory computer readable medium 505 may include read-only memory (ROM), random-access memory (RAM), TCAM, flash memory, other storage, or a combination thereof.

In the illustrated example, the rules 508 may include instructions 509 to cause the switch 501 to forward an address resolution packet to a network controller. In various implementations, the address resolution packet may be an address resolution request or an address resolution response. For example, the instructions 509 may cause the switch 501 to forward an address resolution request when acting as an edge switch for a source host. As another example, the instructions 509 may cause the switch 501 to forward an address resolution response when acting as an edge switch for a target host. In some implementations, when executing the instructions 509, the processor 503 may forward an address resolution packet received from a host via the network interface 504 to a controller via control interface 502. In some implementations, the instructions 509 may be received from a network controller via the controller interface 502. For example, the instructions 509 may be received during configuration when the switch 501 joins a network.

In the illustrated example, the rules 508 further include instructions 510 to rewrite a source link address of a first packet if a first packet is received from a host. For example, the host may be a host that generated an address resolution packet forwarded in accordance with instructions 509. In some implementations, the instructions 510 may be executable by the processor 503 to rewrite the source link address of a first packet received from the host via the network interface 504. In some implementations, the instructions 510 instruct the processor to rewrite the source link address of the first packet to the switch's link address 512. For example, the link address 512 may be the switch's 501 MAC address.

The instructions 510 may cause the processor 503 to determine if the first packet is from the host by determining if the first packet has a source internetwork address that is the host's internetwork address. For example, the instructions 510 may be provided via the control interface 502 as a match criterion and an action. The match criterion may match the packet's source internetwork address and the host's internetwork address. The action may be to rewrite the packet's source link address to the switch's link address 512.

In the illustrated example, the rules 508 further include instructions 511 to rewrite a destination link address of a second packet if a second packet destined for the host is received. In some implementations, the instructions 511 may be executable by the processor 503 to rewrite the destination link address of the second packet to the host's link address.

The instructions 511 may cause the processor 503 to determine if the second packet is destined for the host by determining if the second packet has a destination internetwork address that is the host's internetwork address. For example, the instructions 511 may be provided via the control interface 502 as a match criterion and an action. The match criterion may match the packet's destination internetwork address and the host's internetwork address. The action may be to rewrite the second packet's destination link address to the host's link address.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
  receiving, by a network controller, an address resolution request from a first switch;
  determining, by the network controller, that the address resolution request is originally from a request source requesting an address of a response source;
  determining, by the network controller, whether the address of the response source requested in the address resolution request is listed in a database maintained by the network controller:
  in response to a determination that the address of the response source is not listed in the database:
    rewriting, by the network controller, the address resolution request by changing a source address in the address resolution request from an address of the request source to an address of the first switch and broadcasting, by the network controller, the rewritten address resolution request to switches in a network including a second switch connected to the response source;

receiving, by the network controller, an address resolution response from the second switch;

in response to a determination that the address resolution response is originally transmitted from the response source and destined to the first switch, rewriting, by the network controller, the address resolution response by changing a source address in the address resolution response from the address of the response source to an address of the second switch; and transmitting, by the network controller, the rewritten address resolution response to the first switch for the first switch to send the rewritten address resolution response to the request source; and in response to a determination that the address of the response source is listed in the database:
determining the response source is associated with the second switch;
generating an address resolution response having the address of the second switch as a destination address: and
broadcasting the address resolution response to the switches in the network for the switches to update address tables at the switches.

2. The method of claim 1, further comprising:
obtaining the address of the request source from the address resolution request; and
wherein the step of rewriting the address resolution response further comprises changing a destination address in the address resolution response from the address of the first switch to the address of the request source.

3. The method of claim 2, further comprising:
storing the address of the request source in association with the address of the first switch in the database;
obtaining the address of the response source from the address resolution response; and
storing the address of the response source in association with the address of the second switch in the database.

4. The method of claim 1, further comprising:
receiving a second address resolution request from the request source, via the first switch, requesting an address of a second response source;
determining, by the network controller, whether the address of the second response source is listed in the database; and
in response to a determination that the address of the second response source is listed in the database, transmitting, by the network controller, a second address resolution response, having the address of the second response source, to the first switch.

5. The method of claim 1, further comprising:
transmitting, from the network controller to the first switch, a first rule to rewrite a first packet received from a host to have the address of the first switch as a source address in the first packet; and
transmitting, from the network controller to the first switch, a second rule to rewrite a second packet destined for the host to have an address of the host as a destination address in the second packet.

6. The method of claim 1, further comprising:
establishing a path between the first switch and the second switch; and
transmitting a forwarding rule to a third switch in the path to implement the path.

7. A network controller, comprising:
a processor; and
a memory storing instructions that when executed by the processor cause the processor to:
receive an address resolution request from a first switch,
determine that the address resolution request is originally from a request source requesting an address of a response source,
determine whether the address of the response source requested in the address resolution request is listed in a database maintained by the network controller,
in response to a determination that the address of the response source is not listed in the database, the instructions are to cause the network controller to:
rewrite the address resolution request by changing a source address in the address resolution request from an address of the request source to an address of the first switch, and broadcast the rewritten address resolution request to switches in a network including a second switch connected to the response source,
receive an address resolution response from the second switch,
in response to a determination that the address resolution response is originally from the response source and destined to the first switch, rewrite the address resolution response by changing a source address in the address resolution response from the address of the response source to an address of the second switch, and
transmit the rewritten address resolution response to the first switch for the first switch to send the rewritten address resolution response to the request source; and
in response to a determination that the address of the response source is listed in the database, the instructions are to cause the network controller to:
determine that the response source is associated with the second switch;
generate an address resolution response having the address of the second switch as a destination address; and
broadcast the address resolution response to the switches in the network for the switches to update address tables at the switches.

8. The network controller of claim 7, wherein:
the instructions are to cause the processor to rewrite the address resolution response by changing a destination address in the address resolution response from the address of the first switch to the address of the request source.

9. The network controller of claim 7, wherein the instructions are to cause the processor to store in the database:
the address of the request source in association with the address of the first switch; and
the address of the response source in association with the address of the second switch.

10. The network controller of claim 7, wherein the instructions are to cause the processor to:
establish a first path between the first switch and the second switch by transmitting a first forwarding rule to a third switch in the first path, and establish a second path between the first switch and the second switch by transmitting a second forwarding rule to a fourth switch in the second path.

11. The network controller of claim 7, wherein the instructions are to cause the processor to:
provide a rule to the first switch for the first switch to rewrite a source address of a packet from the address of the request source to the address of the first switch if the packet is received from a first host.

12. The network controller of claim 11, wherein the instructions are to cause the processor to:
provide a second rule to the second switch for the second switch to rewrite a source address of a second packet from the address of the response source to the address of the second switch if the second packet is received from a second host.

13. The network controller claim 11, wherein the instructions are to cause the processor to:
provide a second rule to the first switch for the first switch to rewrite a destination address of a second packet from the address of the first switch to the address of the first host if the second packet is destined for the first host.

14. A non-transitory computer readable medium, storing instructions executable by a processor of a network controller to cause the network controller to:
receive an address resolution request from a first switch;
determine that the address resolution packet is originally from a source host requesting an address of a destination host;
determine whether the address of the destination host requested in the address resolution request is listed in a database maintained by the network controller;
in response to a determination that the address of the destination host is not listed in the database, rewrite the address resolution request by changing a source address in the address resolution request from an address of the source host to an address of the first switch and broadcast the rewritten address resolution request to switches in a network including a second switch connected to the destination host;
receive an address resolution response from the second switch;
in response to a determination that the address resolution response is originally from the destination host and destined to the first switch, rewrite the address resolution response by changing a source address in the address resolution response from the address of the destination host to an address of the second switch and changing a destination address in the address resolution response from the address of the first switch to the address of the source host; and
transmit the rewritten address resolution response to the first switch for the first switch to send the rewritten address resolution response to the source host;
in response to a determination that the address of the response source is listed in the data base, the instructions are to cause the network controller to:
determine that the destination host is associated with the second switch;
generate an address resolution response having the address of the second switch as a destination address; and
broadcast the address resolution response to the switches in the network for the switches to update address tables at the switches.

15. The non-transitory computer readable medium of claim 14, wherein, when executed, the instructions cause the network controller to:
obtain the address of the destination host from the address resolution response; and
store the address of the destination host in association with the address of the second switch in the database.

16. The non-transitory computer readable medium of claim 14, wherein the instructions cause the network controller to:
receive a second address resolution request from the first switch, wherein the second address resolution request is originally from the source host requesting an address of a second destination host; and
in response to a determination that the address of the second destination host is listed in the database, transmitting a second address resolution response, having the address of the destination host as a destination address, to the first switch.

17. The non-transitory computer readable medium of claim 14, wherein the instructions cause the network controller to:
transmit, to the first switch, a first rule for the first switch to, in response to receiving a first packet from a host, change a source address in the first packet from an address of the host to the address of the first switch; and
transmit, to the first switch, a second rule for the first switch to, in response to receiving a second packet destined to the host, change a destination address in the second packet from the address of the first switch to the address of the host.

* * * * *